Patented Aug. 4, 1936

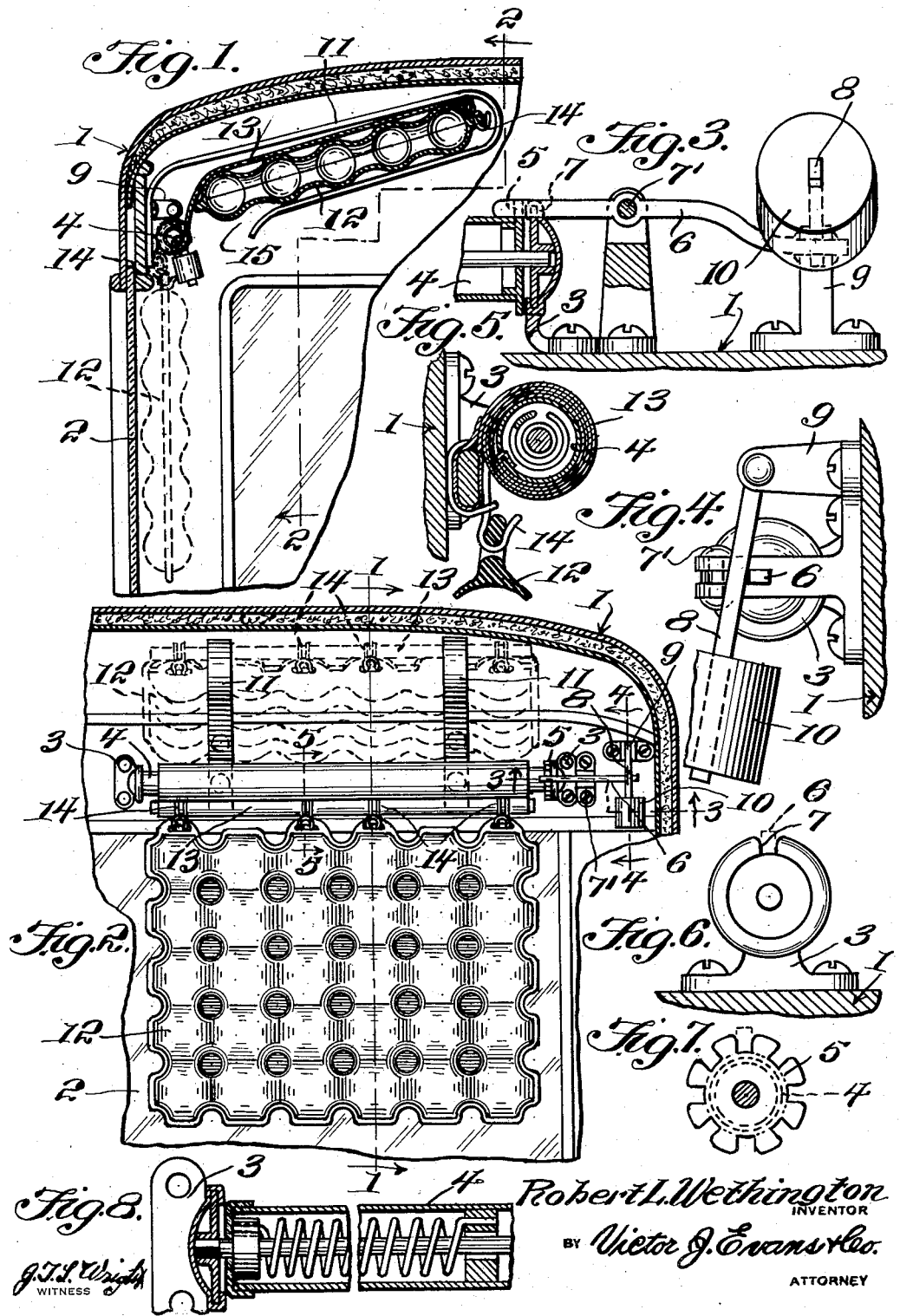

2,050,141

UNITED STATES PATENT OFFICE 2,050,141

AUTOMATIC AUTOMOBILE LIFE PRESERVER

Robert L. Wethington, Columbia, Ky.

Application October 31, 1935, Serial No. 47,693

1 Claim. (Cl. 296—84)

This invention relates to an automatic automobile life preserver and more particularly to a protector adapted to prevent automobile occupants from injury in case of an accident and has for the primary object the provision of a device of this character which is simple, durable and economical to manufacture and install and will normally maintain a position which in no way will inconvenience the occupants of the automobile and will automatically assume a protecting position by the sudden stopping of the automobile to avoid a collision or if in a collision or may be manually brought into protecting position should the occupant of the automobile be aware of danger of an accident prior to the happening thereof.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary longitudinal sectional view showing a portion of an automobile body equipped with my invention and taken on the line 1—1 of Figure 2.

Figure 2 is a fragmentary transverse sectional view taken on the line 2—2 of Figure 1 showing the device in protecting position in full lines and in non-protecting position in dotted lines.

Figure 3 is a detail sectional view taken on the line 3—3 of Figure 2.

Figure 4 is a detail sectional view taken on the line 4—4 of Figure 2.

Figure 5 is a sectional view taken on the line 5—5 of Figure 2.

Figure 6 is an end view showing a spring driven roller of the device held by a latch.

Figure 7 is a plan view of a latch disc secured to the spring driven roller.

Figure 8 is a fragmentary sectional view showing the spring driven roller.

Referring in detail to the drawing, the numeral 1 indicates a fragmentary portion of a motor vehicle, the windshield thereof being indicated by the numeral 2. My invention is shown associated with the automobile so as to afford protection to the occupants of the automobile from being thrown against the windshield in case of a sudden stop or when in a collision. While the application of my invention is thus illustrated it is to be understood that any number of these devices may be adapted to the automobile for the purpose of protecting the occupants from the windows and other parts of the automobile against which the occupants may be thrown in case of an accident.

Secured to the automobile 1 above the windshield are brackets 3 which support a spring driven roller 4 equipped at one end with a notched disc 5. To retain the spring driven roller 4 against rotation a pivotally mounted latch arm 6 is provided, one end of which engages one of the notches of the disc 5 and also engages in the notch 7 of one of the brackets 3. The latch arm 6 is pivoted to a bracket, as shown at 7', and the other end thereof is overlaid by a depending and pivotally mounted weight arm 8. The arm 8 is pivoted to a bracket 9 which carries a weight 10, as clearly shown in Figure 4. The friction between the walls of the notches heretofore referred to and the latch arm is sufficient to retain said latch arm normally against pivotal movement. However, should the automobile stop suddenly from some cause, such as a collision, the momentum of the automobile imparts pivotal movement to the weight 10 rocking the latch arm 6 on its pivot 7' freeing the spring driven roller 4.

Elongated brackets 11 are mounted on the automobile 1 above the spring driven roller 4 and adjacent the roof of the automobile and support a protector or cushion 12 to which is secured a strip of flexible material 13, one end of which is secured to the spring driven roller and the other end removably secured by hooks 14 to one end or edge of the cushion or protector 12. The elongated brackets 11 normally support the cushion or protector above windshield 2 and said brackets 11 are provided with throats 15 disposed directly above the windshield so that when the roller 4 is released and self-driven in one direction it will wind the strip 13 thereon drawing the cushion or protector 12 from the brackets whence it may gravitate to become positioned between the windshield 2 and the occupants of the automobile so that should the occupants be thrown in the direction of the windshield they will engage with the protector or cushion and thereby be prevented from injury.

Should an occupant of the automobile have sufficient warning of an accident, the roller 4 may be released by manual manipulation of the weighted arm 8 so that said roller 4 may automatically position the protector in protecting position.

Having described the invention, I claim:

In combination with an automobile having a windshield, brackets secured to the automobile above the windshield, a cushion normally supported by said brackets and removable therefrom, said brackets having throats located adjacent the windshield, a strip of flexible material secured to the end of the cushion furthest from the throat during the occupancy of the rack by the cushion, a spring driven roller supported by the automobile adjacent the throats and the upper edge of the windshield and having the flexible strip secured thereto, and an automatically actuated latch for holding the roller against rotation and adapted to be set in operation by a sudden stopping of the automobile to free the roller so that the latter may draw the cushion from the brackets and suspend said cushion over the windshield.

ROBERT L. WETHINGTON.